J. W. KENYON.
CORN POPPER.
APPLICATION FILED APR. 3, 1913.
1,100,745.
Patented June 23, 1914.
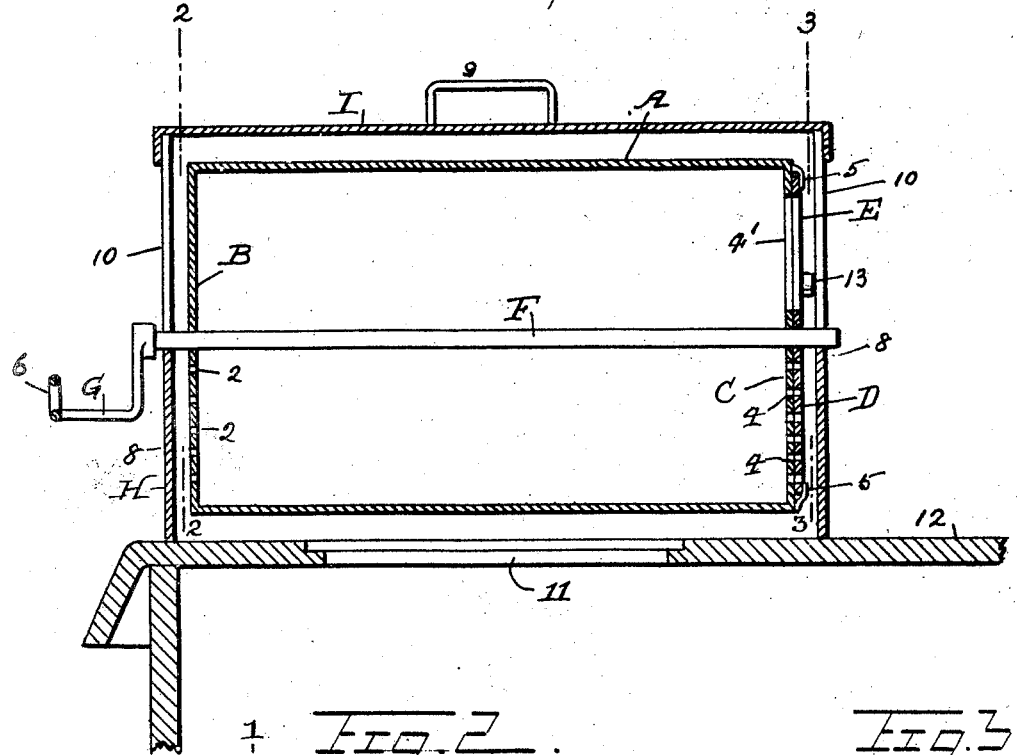
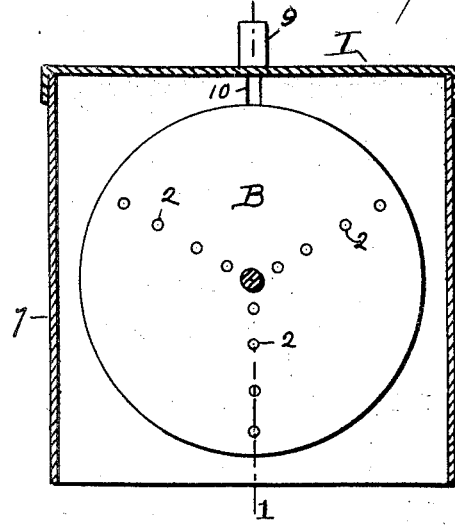
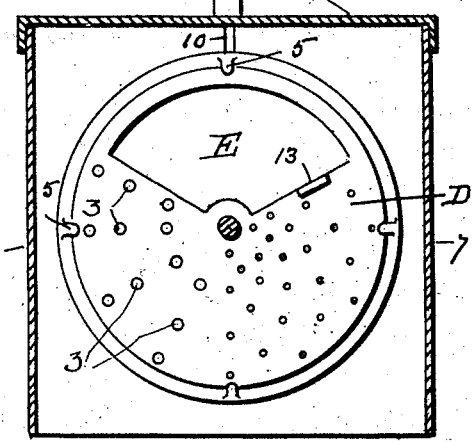
WITNESSES:
M. T. Terry.
James A. Roberts
INVENTOR
John W. Kenyon
BY
F. N. Gilbert
ATTORNEY

UNITED STATES PATENT OFFICE.

JOHN W. KENYON, OF CHENANGO FORKS, NEW YORK.

CORN-POPPER.

1,100,745.

Specification of Letters Patent.

Patented June 23, 1914.

Application filed April 3, 1913. Serial No. 758,616.

*To all whom it may concern:*

Be it known that I, JOHN W. KENYON, a citizen of the United States, residing at Chenango Forks, in the county of Broome and State of New York, have invented certain new and useful Improvements in Corn-Poppers, of which the following is a specification.

My invention relates to a device for popping corn.

The object of my device is to produce a corn popper which shall be simple, durable and inexpensive in construction, which will first thoroughly dry the corn and then thoroughly agitate the corn while it is being popped, which will enable the unpopped corn to be removed without removing the popped corn, and also to enable the said popper to be ventilated.

My invention consists in certain novel features of construction and arrangement of parts as will be hereinafter more fully described, reference being had to the accompanying drawing, in which—

Figure 1 is a longitudinal section taken on the line 1.1 of Fig. 2. Fig. 2 is a cross section taken on the line 2.2 of Fig. 1 and Fig. 3 is a cross section taken on the line 3.3 of Fig. 1.

The same reference characters denote like parts in each of the several figures of the drawing.

In carrying out my invention I provide a cylinder A, the sides as well as ends of which may be of sheet iron or other sheet material, or of wire mesh. In the crank end of said cylinder, I have a solid end wall B, which may have a triangular section provided with small perforations, 2, 2, 2, 2, etc. In the opposite end of said cylinder I have a perforated wall C having in it a triangular section with large perforations, 3, 3, 3, 3, etc., and another triangular section with smaller perforations, 4, 4, 4, 4, also having a triangular opening, 4'. Projecting from the outer portion of the end wall, C, I have a series of clips or lugs, 5, 5, 5, 5. Removably mounted on the face of this end wall C I have the circular cover D which is rotatably mounted on the shaft and held in contact with wall C by means of the bent lugs or guides, 5, 5, 5, 5. Said cover D has in it the triangular opening E, the remaining portion being solid or an additional section may be perforated for ventilation or other purpose. An additional section may be provided with large perforations similar to the perforations 3, 3, as shown in the drawings. The projecting lug 13 is provided to enable the cover or lid D to be turned. Such cylinder A is rigidly mounted upon or attached to the shaft F. On the end of this shaft I have mounted the crank handle G which terminates in the ring 6 by means of which the crank is rotated. As a further part of my device I have the casing H having the side walls 7, 7 and the end walls 8, 8. Said casing has no bottom. Removably mounted on casing H, I have the cover or lid I, surmounted by the handle 9. In the end walls 8, 8 of said casing I have the vertical slots 10, 10 adapted to receive the ends of the shaft F.

In the operation of my device I place the casing H over an open stove hole 11 on the top of stove 12, or over an open gas plate. I then remove the cover I, from the same and lift out the cylinder A and shaft F from the casing. I then turn the outer revolving cap D until the opening E comes opposite the opening 4' in said cylinder end wall. I then pour in the corn to be popped. Having done so I turn the revolving lid D until the portion of D containing the openings 4 covers the opening 4' and then replace the cylinder in the casing H as before. I permit the lid I to remain off until the heat circulating through said casing from the stove hole 11, around the cylinder, thoroughly dries the corn. I then shut down the lid I and hold the increasing heat within the casing. I then turn the crank G revolving the cylinder A slowly until the corn commences to pop, and then very rapidly which throws the corn to the outside of the cylinder and which gives me a popping surface of the whole size of the cylinder, and thus continue to revolve until the corn is thoroughly popped. Removing again the cylinder from the casing, I turn the lid D until the perforations 3, 3, 3, in the cylinder end C are opposite the triangular opening E of the turning lid, and thus permit the small unpopped kernels to pass out through these perforations. I then turn the lid D again until the opening E is opposite the opening 4' in the end wall C and allow the remaining popped corn to flow out. I then refill the popper and proceed as before.

The sectors of the cylinder end C, and the lid D, containing the large perforations 3, may be so disposed that when the sector containing the large perforations 3, in the lid D, is moved opposite the opening 4', in the cylinder end C, the opening E, in the lid D, will be opposite the sector in the cylinder end C, containing the large perforations 3, which will give twice as large a surface for straining out the kernels of unpopped corn, as will be obvious.

Having thus described my invention, what I claim as new and for which I desire Letters Patent is as follows:

1. A corn popper comprising a casing, a shaft journaled therein, a cylinder fixed on the shaft, said cylinder having metal side and end walls, one of the end walls being solid, the other end wall being divided into three triangular sections, one section having a large opening therein, another of said sections being provided with small perforations for ventilating purposes, another of said sections being provided with larger perforations for the passage of kernels of unpopped corn, a cover rotatably mounted on the shaft adjacent the perforated end wall, said cover having a large opening for registration with the opening in the end wall for filling and emptying the cylinder, and provided with areas having small ventilating openings for rotation to a position in front of the large opening in the end wall when the corn is popping and means for rotating the cylinder.

2. A corn popper comprising a casing, a cylinder rotatably mounted in the casing, said cylinder having side and end walls, one of the end walls being solid and provided with ventilating openings, the other end wall having a large opening therein for the introduction and discharge of the corn, said other end wall also having an area provided with small ventilating openings and another area provided with larger perforations for the passage of kernels of unpopped corn, a rotatable cover adjacent the perforated end wall, said cover having a large opening therein for registration with the large opening in the end wall, and having an area provided with small perforations for rotation to a position in front of the large opening in the end wall when the corn is being popped, and another area provided with larger openings for rotation to a position in front of the large opening in the end wall when the kernels of unpopped corn are to be strained out and a handle for rotating the cylinder and for lifting same from casing, said handle being located at the solid end of the cylinder.

In testimony whereof I have affixed my signature in presence of two witnesses.

JOHN W. KENYON.

Witnesses:
O. L. HOWELLS,
E. F. HAWKINS.